Aug. 8, 1950

R. H. FORGY 2,517,860

DEVICE FOR PROTECTING THE OCCUPANTS
AND CONTENTS OF VEHICLES

Filed Oct. 22, 1946

INVENTOR.
ROBERT H. FORGY

BY George B White
ATTORNEY

Aug. 8, 1950
R. H. FORGY
2,517,860
DEVICE FOR PROTECTING THE OCCUPANTS
AND CONTENTS OF VEHICLES
Filed Oct. 22, 1946
4 Sheets-Sheet 2

INVENTOR.
ROBERT H. FORGY
BY George B White
ATTORNEY

Aug. 8, 1950     R. H. FORGY     2,517,860
DEVICE FOR PROTECTING THE OCCUPANTS
AND CONTENTS OF VEHICLES
Filed Oct. 22, 1946     4 Sheets-Sheet 3
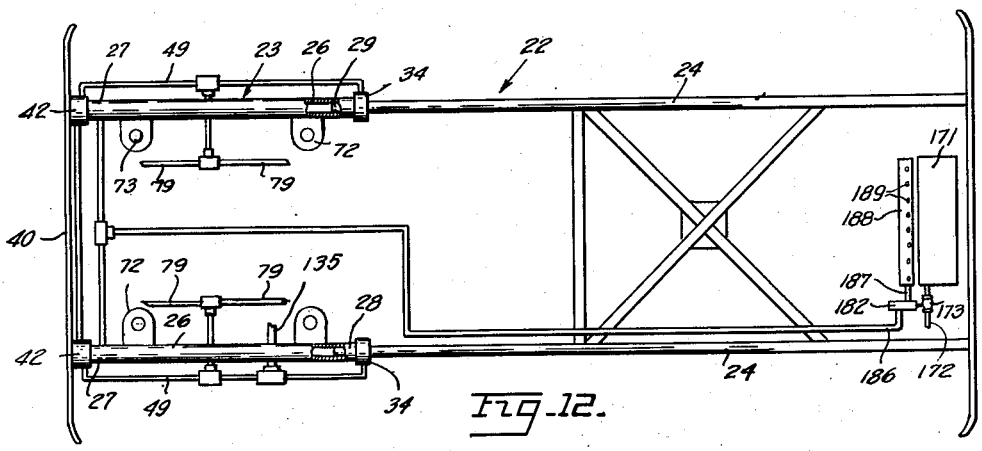
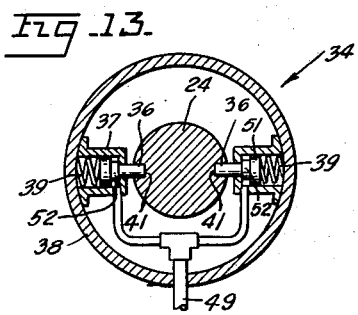
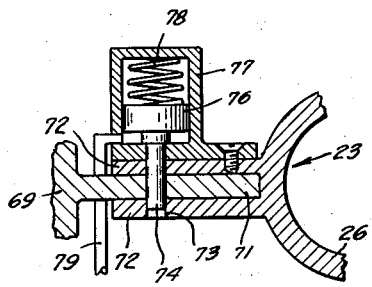
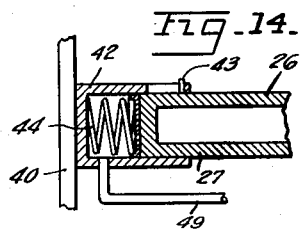
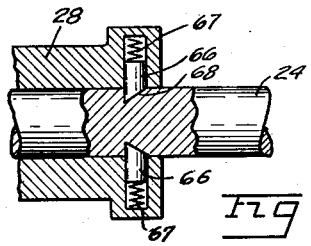
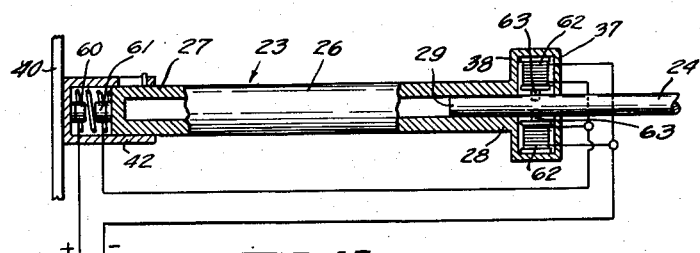
INVENTOR.
ROBERT H. FORGY
BY George B. White
ATTORNEY.

Aug. 8, 1950 R. H. FORGY 2,517,860
DEVICE FOR PROTECTING THE OCCUPANTS
AND CONTENTS OF VEHICLES
Filed Oct. 22, 1946 4 Sheets-Sheet 4
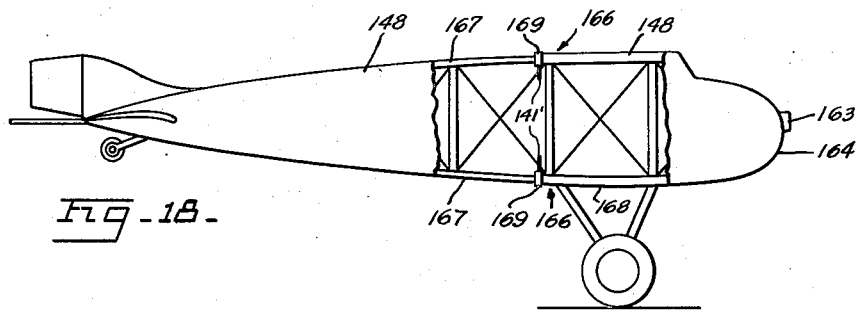
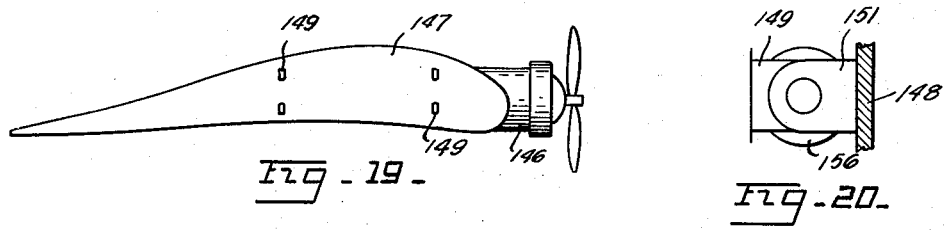 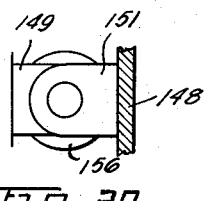
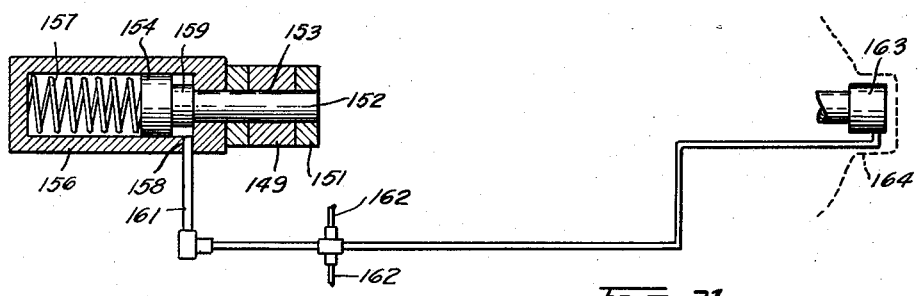
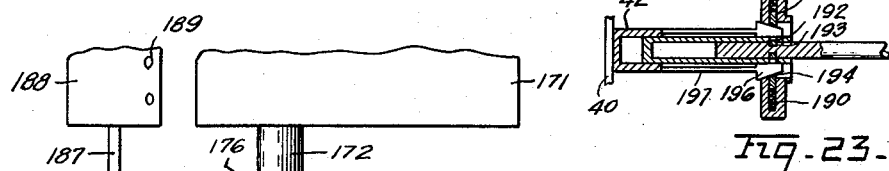 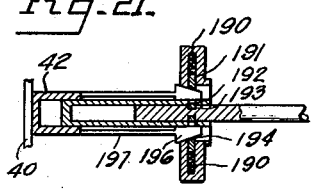
INVENTOR.
ROBERT H. FORGY
BY George B. White
ATTORNEY.

Patented Aug. 8, 1950

2,517,860

UNITED STATES PATENT OFFICE 2,517,860

DEVICE FOR PROTECTING THE OCCUPANTS AND CONTENTS OF VEHICLES

Robert H. Forgy, Centralia, Kans.

Application October 22, 1946, Serial No. 704,879

14 Claims. (Cl. 244—1)

This invention relates to a device of protecting the contents of a vehicle from the force of impact of collision. This application is a continuation in part of application Serial No. 429,412, filed February 3, 1942, now abandoned, for Device for Protecting Occupant and Contents of Vehicles.

The primary object of this invention is to save the occupants of an aircraft vehicle and certain types of land vehicles from the effects of the enormous impact which usually accompanies a wreck or collision. Particularly, it is an object of this invention to accomplish the reduction of the force of impact on the contents of such vehicles by separating such parts of the vehicle in which the occupant is located, from the other parts of the vehicle which have greater weight and moment of inertia at the moment of impact.

An object of the invention is to utilize the force of impact for separating the heavier parts of an aircraft vehicle and certain types of land vehicles from that portion of the vehicle in which the occupants are carried and also to simultaneously cushion the relative motion of the passenger carrying parts of the vehicle.

A further object of the invention is to provide a mechanism whereby the parts of an aircraft vehicle and certain land vehicles are rigidly held together in normal operation but in which the heavier parts are separated from those parts immediately occupied by persons or freight, such as explosives, in the vehicles so as to reduce the force of impact and moment of inertia exerted upon the occupants of such a vehicle in case of collision or wreck, the force of impact being utilized as the automatic actuating force for accomplishing the separation of the masses and forces instantly upon the impact of the collision or wreck.

Another object of this invention is to provide a safety device which is highly useful and simple in construction. Convenience of arrangement, lightness and comparative inexpense of manufacture are further objects which have been borne in mind in the production and development of the invention.

I am aware that some changes may be made in the general arrangements and combinations of the several devices and parts, as well as in the details of the construction thereof without departing from the scope of the present invention as set forth in the following specification, and as defined in the following claims; hence I do not limit my invention to the exact arrangements and combinations of the said device and parts as described in the said specification nor do I confine myself to the exact details of the construction of the said parts as illustrated in the accompanying drawings.

With the foregoing and other objects in view, which will be made manifest in the following detailed description, reference is had to the accompanying drawings for the illustrative embodiment of the invention, wherein:

Fig. 12 is a plan view of the automobile frame showing the hydraulic control for telescoping and the releasable engine mountings.

Fig. 13 is a detail sectional view of the releasable clamp for the telescoping frame sections.

Fig. 14 is a sectional fragmental view showing the bumper cap and actuator on the front end of the frame.

Fig. 15 is a somewhat diagrammatic sectional view of electrical actuation and release for the frame sections.

Fig. 16 is a fragmental detail view of releasable engine mounting.

Fig. 17 is a fragmental view of a releasable clamp for the telescoping frame sections.

Fig. 18 is a partly sectional side view of any airplane with telescoping spars.

Fig. 19 is the end view of motor carrying wing section showing the detachable wing mountings.

Fig. 20 is a detail view of the wing mounting flanges on the airplane.

Fig. 21 is a somewhat diagrammatic view showing the automatic control for releasing the wing mountings.

Fig. 22 is a detail view of an automatic shut-off and sprayer for fuel supply.

Fig. 23 is a fragmental detail view of another form of clamp releasing device.

Figure 1:
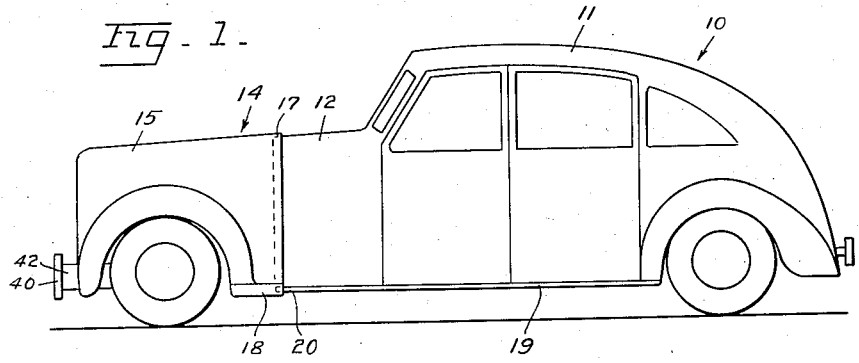
Fig. 1 is a side view of an automobile constructed in accordance with the teachings of my invention.
Figure 2:
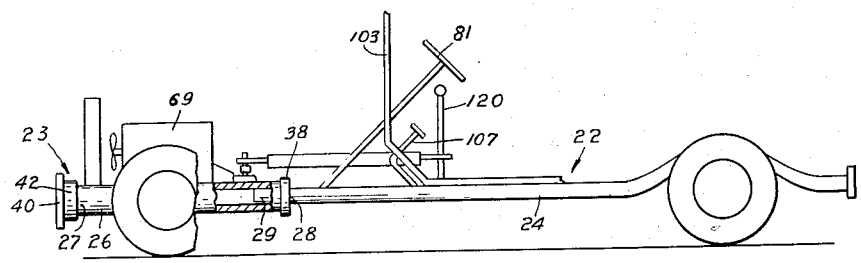
Fig. 2 is a side view of the telescoping automobile frame showing the relative position of the engine and the dashboard.
Figure 3:
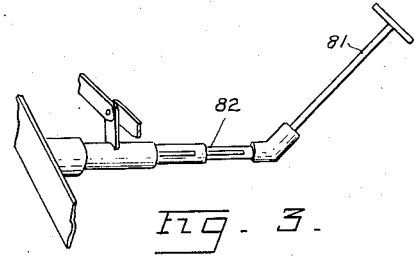
Fig. 3 is a side view of the telescoping connection of the steering mechanism.

Whenever there is a collision between a heavy vehicle and a stationary object or barrier, or another vehicle or moving object coming from the opposite direction, the human brain cannot act quickly enough to react instantly to such a situation for reducing the shock and force of impact of such collision. In my device the force of impact will act instantly and automatically to set in operation forces for reducing and cushioning the shock upon the persons in the vehicle. This is primarily accomplished by reducing the weight to be cushioned to an absolute minimum instantly at the moment of impact. In other words, by separating most of the heavy parts of the vehicle instantly and automatically at the moment of impact, the mass or weight which travels with the human occupant of the vehicle is reduced to an absolute minimum and the movement of this reduced weight is suitably cushioned independently of the separated heavy parts of the vehicle.

In connection with certain types of land vehicles, my invention is carried out by utilizing the force of impact to separate portions of the vehicle in which the passengers are located from the other heavy parts of the vehicle and to separately cushion the relative movement of the passenger carrying portion of the vehicle so as to reduce the weight, velocity and the resultant moments of inertia that act upon the relative movement of the passengers in case of collision or wreck of such automobile. It is also preferable that the cushioning shall be accomplished by means of fluid and that the fluid utilized for such cushioning be progressively and suitably discharged and be so composed as to act as fire extinguisher. It is to be noted in this connection that the carrying out of this cushioning is preferably accomplished without materially increasing the overall length of the vehicle or without destroying any of the fundamental purposes or actions of the vehicle. It is also to be noted that the front part of the vehicle may be sacrificed because the emphasis is placed upon the reduction of the shock on the minimum parts of the vehicle which are necessary for the safety of the human life.

In connection with airplanes, the force of impact is utilized for automatically separating the wings and engines and other heavy parts from such portions of the fuselage in which human occupants are located, and also to automatically set in operation cushioning of the parts containing passengers or crew relatively to the other parts of the fuselage. This is again accomplished by a structure which has a normal rigidity necessary for the usual operation and flight of the airplane and such rigidity is separated and broken down instantly and automatically when the force of impact exceeds a predetermined degree and reaches such a force that is impacted on an airplane only in case of a wreck. The force of such impact is the actuating force for such separation of parts.

Basically in all of these vehicles the operation involves the steps of cushioning the impact of the vehicle, without affecting the general vehicle structure, until the force of impact exceeds a predetermined degree, but after the force of such impact exceeds that degree the heavier portions of the vehicle are instantly and automatically separated, by the application of such force, from such portions of the structure which contain passengers or crew, and by the same force cushioning forces are set in action to slow down the relative movement of that human carrying structural portion of the vehicle and bring it to a gradual stop. In addition, the same actuating force shuts off the fuel supply to prevent fire, and also liberates and sprays "fire extinguishing" fluid preferably near the tank to extinguish fires that might have been caused by such collision or wreck.

In the illustrative embodiment of my invention in connection with a motor vehicle of the usual type such as an automobile, I make use of the automobile body 10 which is preferably divided into the body proper indicated at 11 including a rear portion 12 of the hood 14, and the front portion 15 of said hood which is made separate from the rear portion 12 and slightly overlaps the latter as shown at 17, so as to permit the rear portion to slide under said front portion.

The front portion 18 of a running board 19 of the automobile is made hollow to accommodate the front end 20 of said running board and to permit the same to telescope into said front portion 18.

The above described arrangement of parts permits the automobile body proper 11 to telescope into the front portion 15 in case of collision or wreck.

The body 10 is supported on a chassis 22. This chassis is made of a forward frame section 23 which is formed with hollow members into which a rear frame section 24 can telescope. The chassis 22 is supported in any suitable manner upon usual suitable wheels or tracks. The forward frame section 23 includes hollow longitudinal members 26 which are closed at the front ends 27 and open at the respective rear ends 28. The hollow interiors of the members 26 function as cylinders. The forward ends 29 of the rear frame sections 24 fit into the hollow interiors of the cylinder members 26 so that the forward ends 29 of the rear frame sections 24 operate as pistons or plungers in the cylinder members 26.

The cavity in the cylinder members 26 is provided with suitable medium for slowing down the relative motion of the piston ends 29 into the cylinder members 26. It is preferable to fill the chamber or cavity in the cylinder members 26 with suitable fluid such as oil or the like which contains some chemical compound capable of functioning as a fire extinguisher. Suitable safety valves or nozzles, as hereinafter described, spray the escaping fluid in selected directions near any inflammable contents of the vehicle, for instance a fuel, light or cooling tank, for extinguishing fire that may occur in the event of a collision or wreck.

In order that the vehicle operate in a normal manner, the forward and rearward sections 23 and 24 are rigidly held in a normal initial position to form the rigid chassis 22. The releasable connecting mechanism 34 which rigidly unites the sections 23 and 24 is herein illustrated as consisting of clamping blocks 36 each being slidable through the walls of a radial cylinder 37 of a ringlike clamp body 38. Springs 39 in the respective cylinders 37 force the respective clamp blocks 36 into keeper holes 41 in the periphery of the rear sections 24 of the chassis 22. The clamp body 38 forms an integral part of the rear end 28 of the respective cylinder members 26 so that when the clamping blocks 36 are in engagement with the respective keeper holes 41 in the rear section 24 then relative movement of the sections 23 and 24 is positively prevented.

Suitable means are provided for automatically and instantaneously withdrawing the clamping blocks 36 from the keeper holes 41 in the event of a collision or wreck. This releasing mechanism may be hydraulic or electric or other suitable mechanism.

The hydraulic releasing mechanism is illustrated in Figs. 12, 13, and 14. On the front end of the forward section 23 are provided bumper caps 42 which are slidably held on the ends of the forward sections 23. Abutments 43 in suitable slots in the skirts of caps 42 limit the forward stroke and position of these bumper caps 42. Suitable coil springs 44 in each bumper cap 42 bear against the forward frame ends so as to resist the collapsing or rearward motion of these bumper caps 42. These coil springs 44 are so adjusted that they do not permit any movement of the bumper caps 42 until such time that the force of impact applied thereon exceeds a limit predetermined by the tension of the springs 44. When the impact is so strong that it exceeds said limit then it pushes the bumper caps 42 against the action of the springs 44 to its inner limits. The space in each bumper cap 42 is filled with liquid. Inasmuch as liquid is not compressible, the movement of the bumper caps 42 will be instantaneously transmitted through an actuator conduit 49. This actuator conduit 49 extends from the space in the bumper caps 42 into the small cylinders 37 in the clamp bodies 38. Each clamping block 36 terminates in a piston 51 which works in one of the radial cylinders 37 in the clamp body 38. The springs 39 urge the pistons 51 centrally so as to keep the respective clamping blocks 36 in locking position. A collar 52 at the point where the block 36 is joined to the piston 51 spaces the piston 51 from the end wall of the cylinder 37. The actuator conduit 49 conveys the liquid into the cylinder 37 at said space around the collar 52 so as to force the pistons 51 outwardly against the action of the springs 39 and thus withdraw the clamping blocks 36 from the keeper holes 41. In this manner the movement of the bumper caps 42 will be instantaneously converted into movement of the blocks 36 so that the rigid connection between the frame sections 23 and 24 is broken and these sections collapse or telescope in the manner heretofore described. A bumper 40 is connected to the caps 42.

An electrical actuating mechanism is illustrated in Fig. 15, wherein circuit contacts 60 and 61 are located in normally open position on the bumper cap 42 and on the front end of the forward section 23 so that when the bumper caps 42 are moved by the impact of collision to the extreme inner stroke then they close the contacts 60 and 61. The contacts 60 and 61 are in turn connected through a source of electricity to the circuit of electromagnets 62 which latter are located in the small cylinders or pockets 37 in the clamp body 38. The cores 63 of these electromagnets are connected respectively to the clamping blocks 36 and the action of the magnets is of sufficient strength to so move the cores 63 as to withdraw the clamping blocks 36 from the keeper holes 41 rapidly whenever the electromagnets 62 are energized. In other respects the operation of this mechanism is the same as the mechanism heretofore described.

In some instances this connection may be accomplished by such mechanical construction of the clamping blocks and of the keeper holes as to automatically release under a predetermined shearing stress. Such an arrangement is illustrated in Fig. 17. The clamping blocks 66 of this embodiment terminate in inclined wedge shaped points, the sloping side of each of which faces toward the rear section of the frame so that when the force of impact reaches such strength as to overcome the action of the springs 67 behind said blocks 66 then the resultant force exerted by the inclined side of the socket 68 on the inclined wedge side of the blocks 66 forces the blocks 66 out of the sockets 68 and thereby disengages the frame sections from each other and permits their relative telescoping and cushioning in the manner heretofore described.

In order to further separate the mass and weight that may exert forces of inertia on the passenger carrying body of the vehicle, the engine 69 is also so mounted as to be automatically separated simultaneously with the unlocking of the frame sections. This is accomplished by releasable mounting means for the engine 69. Base flanges 71 of the engine 69 are secured between mounting flanges 72 extended from the front frame section 23 inwardly of the vehicle. Through registering holes 73 in the flanges 71 and 72 extend bolts 74 to securely mount the engine 69 in its usual place. The head 76 of each bolt 74 is in the form of a piston working in a cylinder 77 which latter is fixed on the top mounting flanges 72. A spring 78 holds each bolt head 76 and bolt 74 in place. A conduit 79 connects the space below each bolt head 76 to the hydraulic pressure control lines so that when hydraulic pressure acts on the frame clamping means, the same pressure also pushes the bolt heads 76 and the bolts 74 upwardly so as to withdraw the bolts 74 from the flanges 71 and 72 and thus allow the moment of inertia of the engine 69 to act independently to pull its flanges out of the mounting flanges without adding mass and weight to the forces exerted on the vehicle body and the persons in said body.

In order to prevent the steering column 81 of the vehicle from pushing up against the driver in the vehicle I provide suitable means to allow the column 81 to take the impact force only beneath the body of the vehicle. In the herein illustration the steering connection 82 to the bottom of the column 81 is made telescopically so as to collapse when the frame sections are collapsed without exerting upward pushing force on the column 81. As a further protection the seats in the car may be also mounted on one or more cushioned carriages operating in the manner described in connection with carriage in the hereinabove described embodiment.

Figure 4:
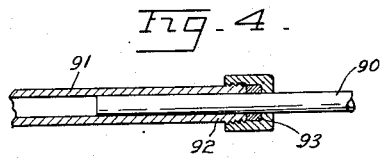
Fig. 4 is a longitudinal cross-section of the telescoping pipe connection.
Figure 5:
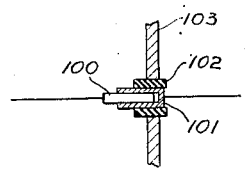
Fig. 5 is a cross-section of an electric plug.
Figure 6:
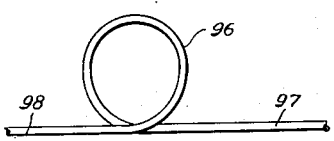
Fig. 6 is a side view of the pipe loop.
Figure 7:
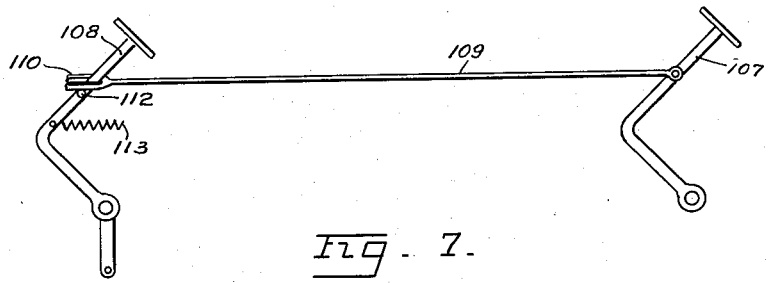
Fig. 7 is a releasable connection between the clutch pedal and the clutch mechanism.
Figure 8:
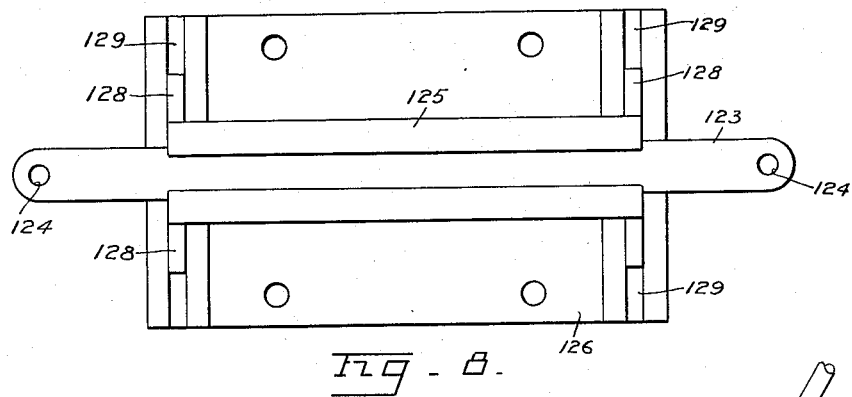
Fig. 8 is a plan view of the connecting mechanism between the gear shift lever and the gear shift.
Figure 9:
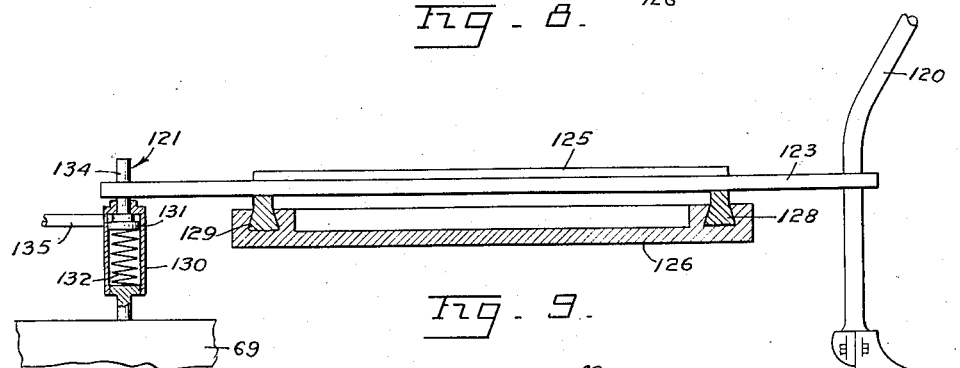
Fig. 9 is a side view of said connecting mechanism, some parts being shown in elevation.
Figure 11:
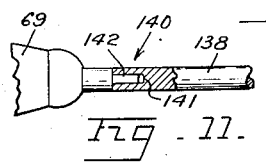
Fig. 11 is a side view of the spline connection of the drive shaft, some parts being shown in section.
Figure 10:
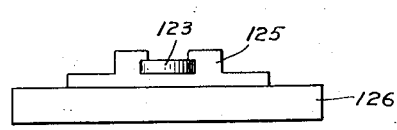
Fig. 10 is an end view of said connecting mechanism.

In addition to said steering column 81 there are other numerous connections between the engine 69 and the body portion 11 attached to and carried by the rear frame section 24, which connections are arranged in such a way as to not interfere with the forward movement of the body portion 11 in relation to the front portion 15 which is attached and carried by the forward frame section 23. Gas pipes, hydraulic brake pipes and an exhaust pipe may be arranged to telescope or be instantly disengaged, as shown in Fig. 4, in which a pipe 90 fits into a pipe 91 which has on its free end 92 a packing gland 93 by means of which leakage between said pipes is prevented. Instead of the latter arrangement, a loop 96 of fair size may be used, as shown in Fig. 6. This loop permits the movement of the end 97 of said loop in relation to the end 98.

Numerous electric wires which connect the dashboard 103 of an automobile with the motor 69, may be made to terminate with a plug 100, which fits into a cup shaped terminal 101 set in insulation 102 on the dashboard 103. In case of collision, the falling motor 69 pulls the plugs 100 out of the terminals 101, thus preventing the possibility of a fire through a spark in various electrical connections and apparatus which may still be functioning.

The accelerator, or a clutch operable by a usual foot pedal 107 may be connected to a clutch pedal 108 on the motor 69, or to a carburetor, not shown in the drawing, by a rod 109 having a fork 110 on its forward end, which fork straddles the clutch pedal 108, or a lever of the carburetor, and rests on a supporting means such as a pin 112.

A spring 113, one end of which is attached to the engine 69 and the other to the pedal 108, constantly presses said pedal against said fork 110 thus keeping them in contact all the time. When the engine 69 is disengaged from the forward frame section 23 and falls down, the pedal 108 slips out of the fork 110, thus ending the connection between the clutch, or the carburetor, with the foot pedal 107.

Various arrangements may be provided to connect a lever 120 arranged in the body portion 11 with the gear shift lever 121 so that the latter lever would duplicate the motions of the first and yet be instantly disengaged from each other in the case of collision. For the purpose of illustration, I show a link 123 having an opening 124 in each end thereof through which the levers 120 and 121 freely pass. The link 123 is slidably carried in a frame 125, which in turn is arranged for transverse sliding in a supporting plate 126. The frame 125 has a transverse dovetail key 128 on each end thereof adapted to slide in a groove 129 in the plate 126, which is attached to the rear frame section 24. This arrangement permits the link 123 to slide longitudinally in the frame 125 and transversely with the said frame. Therefore, all the movements of the lever 120 are duplicated by the lever 121.

The lever 121 may be instantly disengaged from the link 123 in case of collision by the following releasing mechanism. The lever 121 comprises a cylinder 130 in which a piston 131 is slidably arranged. A spring 132 constantly keeps the piston pressed against the upper end of said cylinder. A shaft 134 extends from said piston 131 through the top of said cylinder and through the opening 124 in the link 123. A pipe 135 is connected to the top of said cylinder, said pipe extending from the actuator conduit 49. The lower end of the cylinder 130 is formed into a lever 136 which operates the transmission gears in usual manner. In case of collision the liquid is sent forth in the actuator conduit 49 as it has been heretofore described in detail, and it exerts immediate pressure upon the piston 131 thus forcing the latter downwardly, whereby the shaft 134 is withdrawn from the opening 124.

In order to disengage the engine 69 from the drive shaft 138, I provide a spline joint 139 back of the usual universal joint 140, by means of which said engine is instantly disconnected from the drive shaft by pulling the spline 142 from its socket 141.

The above listed major connections between the engine 69 and the body portion 11 of the automobile are shown as made separable. Other possible connections as needed by the particular structures of the various types of vehicles, may be made separable by applying one of the above described adaptations, or conversions, from a standard connection to a separable one.

In operation the automobile has its parts assembled and connected with suitable rigidity for normal operation. When the impact on the bumper caps is of such force as exerted by a collision with a stationary obstacle or with an oppositely moving object, then the releasing mechanisms are set in operation to unlock instantaneously the telescoping portions of the frame, to release the mounting means of the engine and to withdraw the lever 121 from the link 123. This separates the engine weight and the heavy parts at the front of the vehicle from the rear portion 11 of the automobile and reduces the relatively traveling mass and the moment of inertia of the parts traveling with the passengers to a minimum. The residual moment of inertia thus applied causes the rear frame section to collapse into and telescope into the front section. This telescoping movement is dampened and cushioned so as to bring the passenger holding parts of the vehicle to a gradual stop. The cushioned action also forces a fire extinguishing fluid out through suitably located nozzles so as to extinguish fire that may be caused by such collision. While in this illustrative embodiment the front part of the vehicle may be demolished by the force of impact, because the main emphasis is placed on the saving of human lives, nevertheless it is understood that if so desired the front part of the vehicle body may be also made telescoping if the saving of such parts of the vehicle will justify the change of structure of the front parts that may be required for such added safety construction.

An application of the principles of my invention is illustrated in connection with aircraft in Figs. 18 to 21 inclusive. The engines 146 of the airplane are here mounted on the wings 147, and the wings 147 are in turn mounted on the fuselage 148 of the airplane. The wings 147 are provided with yokes 149. In the usual construction there are four such yokes 149 at the base of each wing 147. These yokes 147 fit over four flanges 151 extended from the fuselage 148 of the plane. A bolt 152 extends through registering holes 153 of each of said yokes 149 and flanges 151 to hold the wings 147 in place. In this illustration each bolt 152 has on it a piston head 154 which works in a cylinder 156 mounted on the wings 147. A spring 157 pushes the piston head 154 and the bolt 152 into the bolt holes 153 so as to hold the wings assembled. The cylinder 156 has an intake port 158 between the piston head 154 and the wall of the cylinder 156 nearest to the yoke 149 and a collar 159 spaces the piston head 154 from this wall. Conduits 161 connect this port 158 of each cylinder 156 to a bumper cap 163 and suitably located on the airplane, for instance on the nose 164 of the fuselage 148, which is constructed and operates similarly to the bumper cap mechanisms heretofore described in connection with the automobiles, and is actuated by a crash impact to apply the hydraulic pressure through the liquid in the conduits 161 to the piston heads 154 so as to withdraw the wing securing bolts 152 from the flanges 151 and separate the wings 147 from the fuselage 148 instantaneously and automatically in case of crash and thereby reduce to a minimum the moment of inertia and mass that may act upon the passenger carrying compartments of the airplane.

As a further safety measure the fuselage 149 of the airplane is supported on four or more longitudinal spars 166 each of which may be divided in several telescoping sections. For instance in this illustration each spar 166 is made of two sections, namely a rear section 167 which telescopes into the front section 168 substantially in the same manner as the telescoping frame sections described in connection with automobiles. The releasable locking devices 169 for holding these sections normally rigid are of the same type as heretofore described, and are released by the same action of the bumper caps 163 through conduits 162 in the same manner so as to break the connection of the spars automatically upon crash impact. The front spar sections 168 act as cushioning cylinders and the rear spar sections 167 as pistons or shock absorbing plungers as heretofore described, and the cushioning fluid escapes through suitably located fire extinguishing nozzles in the manner hereinabove stated. Thus in case of an airplane crash the wings are shed from the fuselage and the passenger carrying portions of the fuselage telescope in a cushioned manner to come to a gradual stop and prevent grave injuries. Similar applications can be adapted to air ships and other types of vehicles.

In all the forms of my invention the same mechanism can be also utilized to prevent fire. An illustrative embodiment of this safety feature is shown in Fig. 22. A fuel tank 171 represents the usual fuel container of any vehicle, be it a tank, automobile or airplane. A feed pipe 172 leads from this fuel tank 171 to the usual engine. A safety cock valve 173 of a suitable type is interconnected in the feed pipe 172 so as to normally allow passage of fuel from the tank 171. A leaf spring 174 secured at one end to a lug 176 on the valve body, has its other end secured to the handle 177 of the valve so as to exert a turning moment on the handle toward the closed position of the valve. The spring 174 is so bent as to form an arm 178, which latter is engaged by a tripping rod 179 so as to normally hold the valve in open position. This tripping rod 179 is withdrawn from the spring arm 178 by the same hydraulic pressure created by the relative movement of the collapsible parts caused by the caps upon a crash impact. When so released, the spring 174 snaps over to automatically shut off the fuel flow from the fuel tank 171. A stop 181 on the valve body limits the snapping movement of the valve spring 174 so as to hold it in the shut off position.

The trip releasing mechanism includes a cylinder 182 in which works a piston 183. The tripping rod 179 is extended from the piston 183 and through an end of the cylinder 182. An intake port 184 communicates the cylinder space below said piston 183 with an intake conduit 186, which latter is connected into the hydraulic circuit of the respective telescoping part heretofore described. For instance, in Fig. 12 the intake conduit 186 is connected to the cylinder 66 to receive the fire extinguisher fluid therefrom when the telescoping of the frame members exerts pressure on said fluid in said cylinders 66. An outlet conduit 187 extends from the cylinder 182 on the opposite side of the piston 183 so as to be uncovered after the piston 183 has been actuated and the shut off valve has been closed. A suitable spray conduit 188 with nozzles 189 is arranged on the end of said outlet conduit 187 and along the fuel tank, so as to spray the fire extinguisher liquid toward the tank, after the valve is shut off, and thereby to prevent fire even if the tank is burst by the crash.

In certain types of vehicles (such as trailers or the like, which may not have prime movers thereon) a mechanical clamp releasing mechanism may be provided for the telescoping frame sections 22 and 23. In Fig. 23 I show an illustrative embodiment of such clamp release. The clamping blocks 191 in this form slidably extend through holes 192 through the rear portion of the forward section 22 and engage keeper holes 193 in the periphery of the front end of the rear section 22 to lock the section together. The outer ends of the clamp blocks 191 protrude outwardly from the forward section 22 and each clamp block 191 is urged inwardly by a suitable spring 190 and has a wedge slot 194, the outer wall of which tapers rearwardly and toward the rear frame section 23. A wedge block 196 fits into each wedge slot 194 so that the wider end of the wedge slots 194 are forward of the clamp blocks 191. The inner walls of the slots 194 are suitably spaced from the wedge blocks 196 to allow for outward play. Actuating bars 197 extend from each bumper cap 42 against each wedge block 196 so that when the bumper caps 42 are forced rearwardly by an impact the wedge blocks 196 are pressed into the respective wedge slots 194 and force the clamping blocks 191 outwardly so as to disengage them from the respective keeper holes 193 and thereby permit telescoping of the frame sections. In other respects the device operates as heretofore described.

It is to be further understood that while in this specification and in the claims I refer to the protected parts of the vehicle as occupant containing parts, such term shall include freight carrying parts in case of trucks or trailers or the like, so that when it is desired to cushion explosives or the like transported in such vehicles, the same are protected in the same manner as herein described in connection with occupants or passengers.

In all the embodiments of my invention the weight traveling with the occupants of the vehicle is reduced to a minimum automatically and instantaneously upon a crash impact, and the passenger containing parts of the vehicle are brought to a cushioned gradual stop so as to minimize injury and loss of life. The automatic shut off valve and spraying of fire extinguisher fluid from suitable points of the vehicle further reduce possibility of loss and injury by fire.

I claim:

1. Means to protect the occupants of a vehicle, comprising a frame made of two sections, a first of said sections supporting the occupant containing parts of the vehicle and being movable relatively to the second of said sections, releasable means to connect said sections normally into a rigid unit, releasing means on the vehicle being actuated only by an impact against said second section in excess of a predetermined force to release said connecting means and to permit said first section to continue to move with respect to the second section after such impact stopped the second section, and cushioning means to gradually slow down to a stop said relative motion of the second section and of the occupant containing parts thereon.

2. In a vehicle, means to reduce the momentum acting on the occupants of a vehicle in case of crash or the like, comprising releasable connecting means between certain heavy parts of the vehicle and the occupant containing parts of the vehicle for holding the parts together with normal rigidity, and means actuated by the impact of crash against one of said parts to instantaneously release said connecting means and allow separate relative movements of the respective parts of the vehicle.

3. In a vehicle, means to reduce the momentum acting on the occupants of a vehicle in case of crash or the like, comprising releasable connecting means between certain heavy parts of the vehicle and the occupant containing parts of the vehicle for holding the parts together with normal rigidity, and means actuated by the impact of crash against one of said parts to instantaneously release said connecting means and allow separate relative movements of the respective parts of the vehicle and means actuated simultaneously with the releasing of said parts for shutting off the fuel supply from the fuel container of the vehicle.

4. In a vehicle, means to reduce the momentum acting on the occupants of a vehicle in case of crash or the like, comprising releasable connecting means between certain heavy parts of the vehicle and the occupant containing parts of the vehicle for holding the parts together with normal rigidity, and means actuated by the impact of crash against one of said parts to instantaneously release said connecting means and allow separate relative movements of the respective parts of the vehicle, and means to cushion the relative motion of the occupant containing parts so as to slow gradually the motion of said occupant containing parts to a stop.

5. In a vehicle, means to reduce the momentum acting on the occupants of a vehicle in case of crash or the like, comprising releasable connecting means between certain heavy parts of the vehicle and the occupant containing parts of the vehicle for holding the parts together with normal rigidity, and means actuated by the impact of crash against one of said parts to instantaneously release said connecting means and allow separate relative movements of the respective parts of the vehicle, and means actuated simultaneously with the releasing of said parts to spray a fire extinguisher medium at selected portion of the vehicle.

6. In a vehicle, means to reduce the momentum acting on the occupants of a vehicle in case of crash or the like, comprising releasable connecting means between certain heavy parts of the vehicle and the occupant containing parts of the vehicle for holding the parts together with normal rigidity, and means actuated by the impact of crash against one of said parts to instantaneously release said connecting means and allow separate relative movements of the respective parts of the vehicle, and means actuated simultaneously with the releasing of said parts for shutting off the fuel supply from the fuel container of the vehicle and discharge fire extinguisher medium at selected portion of the vehicle.

7. In a vehicle, means to reduce the momentum acting on the occupants of a vehicle in case of crash or the like, comprising releasable connecting means between certain heavy parts of the vehicle and the occupant containing parts of the vehicle for holding the parts together with normal rigidity, and means actuated by the impact of crash against one of said parts to instantaneously release said connecting means and allow separate relative movements of the respective parts of the vehicle, and means to cushion the relative motion of the occupant containing parts so as to gradually slow the motion of said occupant containing parts to a stop and means actuated by said cushioning means to shut off the fuel supply from the fuel container of the vehicle.

8. In a vehicle, means to reduce the momentum acting on the occupants of a vehicle in case of crash or the like, comprising releasable connecting means between certain heavy parts of the vehicle and the occupant containing parts of the vehicle for holding the parts together with normal rigidity, and means actuated by the impact of crash against one of said parts to instantaneously release said connecting means and allow separate relative movements of the respective parts of the vehicle, and means to cushion the relative motion of the occupant containing parts so as to gradually slow the motion of said occupant containing parts to a stop and means actuated by the cushioning of said parts to discharge fire extinguishing medium at selected portions of the vehicle.

9. In a vehicle, means to reduce the momentum acting on the occupants of a vehicle in case of crash or the like, comprising releasable connecting means between certain heavy parts of the vehicle and the occupant containing parts of the vehicle for holding the parts together with normal rigidity, and means actuated by the impact of crash against one of said parts to instantaneously release said connecting means and allow separate relative movements of the respective parts of the vehicle, and means to cushion the relative motion of the occupant containing parts so as to gradually slow the motion of said occupant containing parts to a stop said cushioning means being fluid operated and the fluid of said cushioning means being a fire extinguisher medium, and means to spray said fire extinguisher medium at selected portions of the vehicle under the pressure of said cushioning.

10. In a vehicle telescoping frame members, releasable means to normally prevent the telescoping of said frame members, and bumper means on the vehicle acutated only by a predetermined impact force against one of said frame members for releasing said releasable means to permit the telescoping of said frame members, the occupant containing portion of the vehicle being supported on one of said frame members so as to move relatively to the other frame member.

11. In a vehicle, forward frame members and rear frame members telescopingly connected to each other, and means to cushion the relative movement of said frame members under the force of an impact in excess of a predetermined force against one of said frame members so as to gradually slow the relative movement of the frame members to a stop, the occupant containing portions of the vehicle being supported on one set of said frame members so as to move with the same relatively to the other set of frame members and the other parts being supported on said other set of frame members releasable means to hold said frame members rigidly together, and means operated by said impact to release said holding means.

12. In a vehicle, releasable mounting means for heavy parts of the vehicle with respect to the occupant containing parts of the vehicle, releasing means to release said mounting means and sever said parts from the vehicle, and means actuated by an impact force against said vehicle in excess of a predetemined force to actuate said releasing means, and means to cushion the movement of the occupant containing parts after the releasing of said heavy parts.

13. In a motor vehicle, a forward frame section, a rear frame section telescopingly connected to the forward rear section, cushioning means between said frame sections, releasable means to normally prevent the telescoping of said frame sections, bumper means on the forward section, and means to connect said bumper means to said releasable means to release said releasable means when a force of impact is applied to said bumper means in excess of a predetermined force.

14. In an aircraft, a fuselage, wings on the fuselage, releasable mounting means for the wings, longitudinal telescoping frame members in the fuselage, releasable means to prevent the telescoping of said telescoping frame sections, means actuated only by an impact force greater than a predetermined force to instantaneously release said wing mounting means and said releasable means on the frame members, so as to allow said wings to move independently of the fuselage and means to cushion the telescoping of said frame members.

ROBERT H. FORGY.

REFERENCES CITED

The following references are of record in the file of this patent:

UNITED STATES PATENTS

| Number | Name | Date |
| --- | --- | --- |
| 1,508,317 | Crocco et al. | Sept. 9, 1924 |
| 1,879,632 | O'Brien | Sept. 27, 1932 |
| 2,069,996 | Carleton et al. | Feb. 9, 1937 |
| 2,147,550 | Sabathe | Feb. 14, 1939 |
| 2,256,857 | Apostolou | Sept. 23, 1941 |